Patented Apr. 22, 1924.

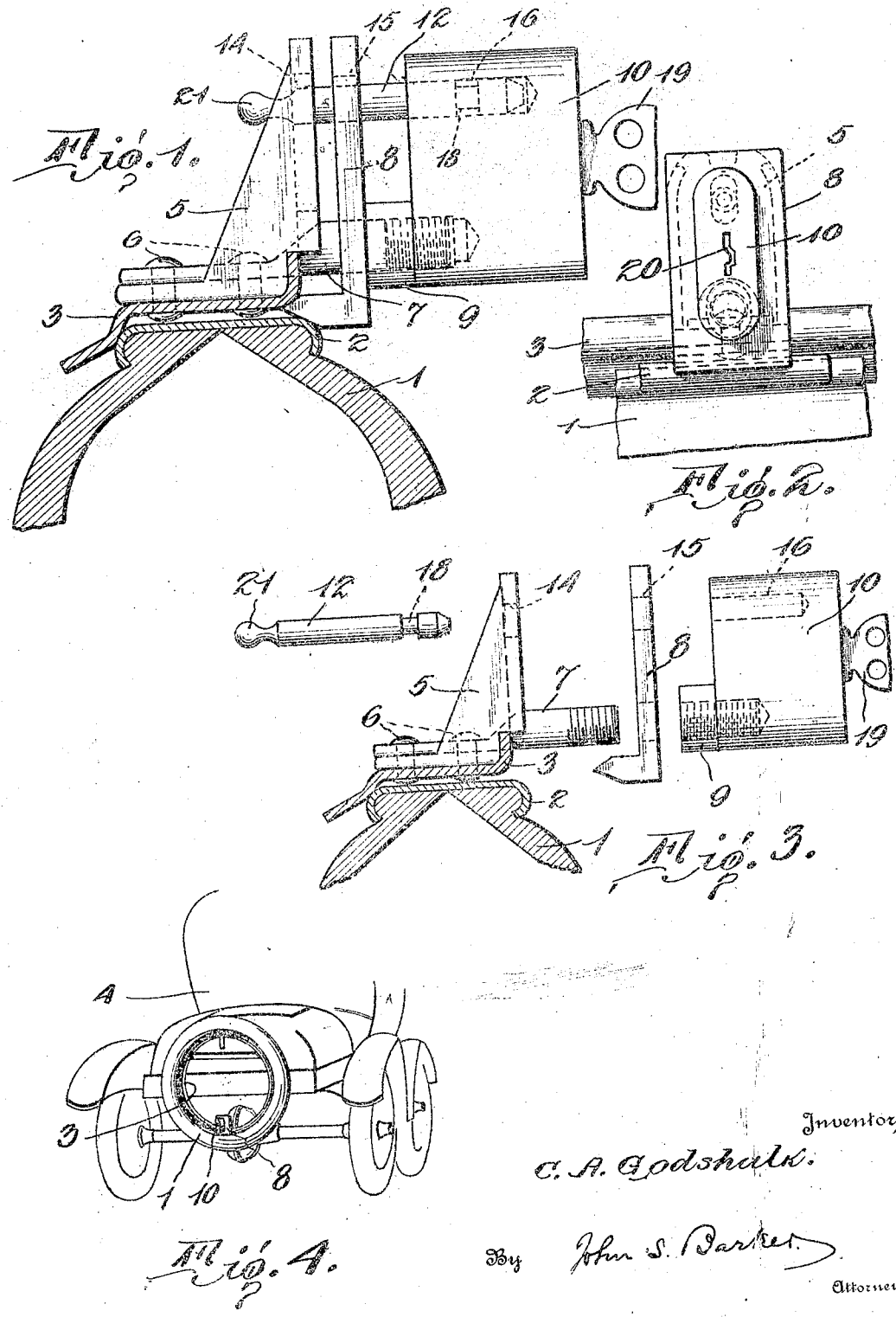

1,491,691

UNITED STATES PATENT OFFICE.

CLARENCE A. GODSHALK, OF ARDMORE, PENNSYLVANIA.

LOCK FOR SPARE TIRES.

Application filed April 25, 1923. Serial No. 634,563.

*To all whom it may concern:*

Be it known that I, CLARENCE A. GODSHALK, a citizen of the United States, residing at Ardmore, in the county of Montgomery and State of Pennsylvania, have invented certain new and useful Improvements in Locks for Spare Tires, of which the following is a specification.

My invention relates to means for locking a nut in place upon a bolt or pin, and which may be put to a wide variety of uses. It consists of a nut, a casing united thereto so as to turn therewith, and key-operated lock mechanism so arranged and operating that the casing may be locked to a fixed or rigid part of the machinery or apparatus in connection with which the nut may be used in such manner as to prevent the turning or removal of the nut except by the use of the proper key which will release the nut from its locked condition. That embodiment of the invention herein presented relates to a lock for preventing theft of spare tires from motor vehicles, and with that specific form of my invention in contemplation one of the objects thereof is to provide a lock for a spare tire having a minimum number of parts and being simple in manufacture and capable of production at small expense.

Another object of the invention is to provide a spare tire lock for automobiles arranged so that noise arising from rattling of parts together under conditions of vibration is eliminated.

A further object of the invention is to provide a lock for a spare tire arranged to cooperate with the usual form of tire carrier wherein the lock also serves as a nut operating against a wedge fitting to rigidly secure the tire in position upon the tire carrier with detachable means for preventing the unscrewing of the nut until the lock tumblers are moved by a key operating in the lock.

A further object of the invention is to provide a lock nut for attachment to all standard forms of spare tire carriers for preventing the removal of a tire from the carrier except by the use of a special cooperating key for the lock.

Another object of the invention is to provide a spare tire carrier with means for retaining the tire thereon having sufficient leverage whereby the screw means may be operated manually without the necessity of a special wrench or tool normally required in securing a spare tire upon a carrier.

My invention will be more clearly understood by reference to the accompanying drawings, in which:

Figure 1 is a partial cross sectional view taken through a portion of a spare tire and tire carrier, showing my lock construction in side elevation; Fig. 2 is an end view looking in the direction of the automobile body to which the tire carrier is normally attached, and showing my spare tire lock with a portion of the carrier and tire mounted thereon; Fig. 3 is a view showing the parts of my lock construction disassembled and aligned for assembly to secure the spare tire upon the tire carrier; and Fig. 4 is a partial perspective view of an automobile with a spare tire carrier on the rear thereof with my lock construction securing the spare tire upon the tire carrier.

Heretofore in the art it has been usual to lock a spare tire upon a tire carrier by utilizing a padlock looping into a bracket on the carrier frame and a wedge shaped member which is secured against the rim of the spare tire by a nut screwed over a bolt extending from the carrier. These forms of tire locks have inherently involved loose parts which rattle and knock together under conditions of vibration as the automobile travels over the road. Such forms of locks require that a special wrench be used, first to screw the retaining nut upon the bolt extending from the tire carrier, and finally the padlock must be applied.

My invention contemplates a construction of lock which serves both as a retaining nut and as a lock with parts which are prevented from rattling under conditions of vibration. I am also aware that locks for spare tires have been suggested which incase the valve stem extending from the tire. In these forms of locks the usual retaining nuts are employed to wedge the extra tire upon the carrier, and the same disadvantage exists as in other types that separate devices must be employed to first secure the tire upon the carrier and finally lock the tire thereon.

Referring to the drawings, the extra tire is indicated by reference character 1 having rim 2 which is supported upon the tire carrier 3 mounted upon the rear or upon a running board of a vehicle 4. The tire carrier includes a bracket fitting 5 secured to the tire carrier as indicated at 6. An extended screw threaded bolt 7 projects from the bracket fitting 5. A wedge shaped member or holding piece 8 is arranged with cam faces bearing against the tire carrier 3 and the tire rim 2, forcing the tire upon the carrier when the screw threaded portion 9 of lock 10 is rotated to take up the threads on the bolt 7. The body portion of the lock 10 is sufficiently extended from the center line of bolt 7 so that the nut 9 may be screwed over the threads of the bolt by rotating the lock merely with the fingers without the use of a special wrench or tool usually required with spare tire carriers. A wrench may be used on the outside of the body at lock 10 to tightly secure the nut portion 9 on the bolt 7. The body portion 10 is rotated to a vertical position, then a pin 12 inserted through aperture 14 in bracket fitting 5, and aperture 15 in wedge shaped member 8, and inserted in socket 16 of the lock. The pin 12 is provided with an annular neck 18 arranged to cooperate with tumblers interior of the lock 10 by which the pin is rigidly secured in the lock. The nut portion 9 cannot be rotated with the pin in the locked position. The lock 10 is operated by a key 19 inserted in key hole 20.

When the tire is to be removed from the tire carrier the key 19 is turned in the lock 10 permitting pin 12 to be manually withdrawn by grasping the head 21 which forms a finger grip, and horizontally withdrawing the pin 12 from the socket 16 and free of apertures 14 and 15. The nut portion 9 may now be unscrewed from the bolt 7 by either rotating the lock 10 with the fingers or utilizing a wrench whereby the spare tire is readily removed from the carrier.

It will be observed that the pin 12 is offset to a considerable distance from the axis of the bolt 7, and is parallel therewith, and that it sets in apertures, 14 and 15, which are all found in the standard equipment of tire carrier which I have illustrated in the drawing, thus making it unnecessary that any alteration be made to such standard equipment. The carrier 3, the bracket 5, the bolt 7, and the holding piece 8 are all utilized exactly as found upon thousands of cars as now equipped with spare tire carriers. I am aware that it has been proposed to lock a nut upon a bolt corresponding with that shown at 7 in the accompanying drawings by means of lock mechanism supported in a casing carried by the nut that engages the bolt, a moving part of which lock enters a longitudinal kerf or channel formed in the bolt, and hence make no claim to such an arrangement; but there are distinct advantages in my invention over and above an arrangement such as just indicated. Such an arrangement necessitates the use of a specially prepared threaded bolt, one having a longitudinal channel to be engaged by the moving part of the lock, but my lock is adapted to be applied directly to the threaded bolt found upon the car, or for that matter found in many other places where the threaded end of a bolt is exposed to receive a nut. Another advantage incident to my construction is that the pin 12 that prevents the turning of the nut and which locks it to a permanent or fixed part of the apparatus is offset at a considerable distance from the axis of the bolt, making it increasingly difficult to force or break the lock in an attempt to remove the nut in an unauthorized manner.

While I have described my invention in a certain specific embodiment, it is to be understood that I intend no limitations upon the invention other than are imposed by the scope of the appended claims.

The use to which the invention is put as described in this specification is illustrative of its specific application to a particular industry. However, the nut, adapted to be locked in position upon a pin or bolt by a key-operated lock that unites the nut with a fixed or rigid part of the apparatus offset from the bolt in connection with which the nut is used, is adapted for use in a great number of other situations where nuts are employed for holding parts of machinery or apparatus in place, and where the unauthorized removal of the nut is to be prevented.

What I claim and desire to secure by Letters Patent of the United States is:

1. A lock for spare automobile tires comprising in combination a carrying frame, a bracket mounted thereon, a threaded bolt extending from said frame, a lock provided with a threaded recess in one portion thereof and a socket member in another portion thereof, a holding member slidably mounted over said bolt, means whereby said lock may be screwed on said bolt and separable means insertable in said socket member for preventing rotation thereof.

2. An automobile tire lock comprising in combination a frame for a tire, a bracket carried by said frame, a bolt extending from said frame, a holding member slidable on said bolt, a lock having a socket in one end thereof adjacent one side, a screw threaded recess in said end adjacent the opposite side whereby said lock may be screwed over said bolt against said holding member, and means insertable in said socket through said bracket and holding member for preventing rotation of said lock.

3. A lock for spare automobile tires comprising a tire carrier, a bracket mounted thereon, a threaded bolt extending from said carrier, a holding member slidably mounted over said bolt, and a lock having a plurality of recesses therein, one of said recesses being screw threaded and arranged to screw over said bolt against said holding member, and the other of said recesses adapted to receive a cylindrical pin passing through said bracket and said holding member, and means for locking said pin against removal.

4. A lock for spare automobile tires comprising in combination a tire carrier, a bracket mounted thereon, a threaded bolt extending from said carrier, a holding member slidably mounted over said bolt, and a lock having a plurality of recesses therein, one of said recesses being screw threaded and arranged to screw over said bolt against said holding member, and the other of said recesses adapted to receive a cylindrical pin passing through said bracket and said holding member, an annularly grooved neck adjacent one end of said pin, and a grip adjacent the opposite end thereof whereby said annularly grooved end may be inserted into said recess and locked against withdrawal.

5. A lock for spare automobile tires comprising a tire carrier, a bracket mounted thereon, a screw threaded bolt extended from said carrier, a holding member slidably mounted over said bolt, means comprising a screw threaded lock arranged to screw over said bolt against said holding member, and a removable extended pin, offset from the bolt arranged to be inserted in said lock for obstructing rotation thereof.

6. A lock for spare automobile tires comprising a tire carrier, an apertured bracket mounted thereon, a screw threaded bolt extended from said carrier, an apertured holding member slidably mounted over said bolt, means comprising a screw threaded lock arranged to screw over said bolt against said holding member, and a removable extended pin arranged to be inserted through said apertured bracket and holding member and in said lock for obstructing rotation thereof.

7. A lock for spare tires and other uses, comprising a nut adapted to be screwed onto a bolt, a casing united with the nut so as to turn therewith, having an opening for receiving a removable locking part, and a key-operated locking mechanism controlling the locking part.

8. A lock for spare tires and other uses, comprising a nut adapted to be screwed onto a threaded bolt, a casing secured to the nut so as to turn therewith, lock mechanism mounted within the casing, and a separable pin adapted to enter the casing and be secured by the lock, the pin extending beyond the casing to engage with a fixed member and thus prevent rotation of the nut.

9. A lock such as stated in claim 8, having the separable pin substantially parallel with the axis of the nut and offset therefrom.

CLARENCE A. GODSHALK.